United States Patent
Stavaeus et al.

(10) Patent No.: US 7,534,016 B2
(45) Date of Patent: May 19, 2009

(54) WINDOW UNIT FOR AN AIRCRAFT WITH SHADING AND LIGHTING FUNCTIONS

(75) Inventors: Mikael Stavaeus, Johanneshov (SE); Bodo Wisch, Bremen (DE); Carsten Kohlmeier Beckmann, Buxtehude (DE); Lars Rowold, Varel (DE)

(73) Assignee: Airbus Deutschland GmbH (DE)

( * ) Notice: Subject to any disclaimer, the term of this patent is extended or adjusted under 35 U.S.C. 154(b) by 136 days.

(21) Appl. No.: 11/702,001

(22) Filed: Feb. 2, 2007

(65) Prior Publication Data

US 2007/0186477 A1    Aug. 16, 2007

Related U.S. Application Data

(60) Provisional application No. 60/765,923, filed on Feb. 7, 2006.

(30) Foreign Application Priority Data

Feb. 7, 2006    (DE)    ........................ 10 2006 005 523

(51) Int. Cl.
*F21V 33/00*    (2006.01)
*B64D 47/02*    (2006.01)

(52) U.S. Cl. ...................... 362/471; 362/470
(58) Field of Classification Search ................ 362/231, 362/470, 471; 349/16; 250/221
See application file for complete search history.

(56) References Cited

U.S. PATENT DOCUMENTS

| | | | |
|---|---|---|---|
| 5,921,670 A * | 7/1999 | Schumacher et al. | 362/480 |
| 6,203,180 B1 * | 3/2001 | Fleischmann | 362/471 |
| 6,547,184 B2 * | 4/2003 | Nieberle | 244/119 |
| 7,178,954 B2 * | 2/2007 | Blechschmidt | 362/471 |
| 7,204,622 B2 * | 4/2007 | Dowling et al. | 362/471 |
| 7,316,486 B2 * | 1/2008 | Klettke | 362/231 |
| 7,355,161 B2 * | 4/2008 | Romig et al. | 250/221 |
| 7,369,062 B2 * | 5/2008 | Stokes et al. | 340/945 |
| 2005/0185399 A1 | 8/2005 | Beermann et al. | |
| 2006/0032980 A1 | 2/2006 | Jugavic et al. | |

FOREIGN PATENT DOCUMENTS

| | | |
|---|---|---|
| DE | 43 28 726 | 3/1995 |
| DE | 199 12 165 | 9/2000 |
| DE | 102 15 559 | 10/2003 |
| DE | 103 29 752 | 2/2005 |

* cited by examiner

*Primary Examiner*—Sandra L O'Shea
*Assistant Examiner*—James W Cranson
(74) *Attorney, Agent, or Firm*—Lerner, David, Littenberg, Krumholz & Mentlik, LLP

(57) ABSTRACT

A window unit for an aircraft with which individual lighting scenarios can be produced. In addition, an aircraft is equipped with at least one window unit. The window unit includes a window pane, which is coated with an electrically actuatable shading device for reducing incidental light entering through the window page. In addition, the window unit includes a control unit for operating the shading device as well as a lighting device for producing a light effect in the region of the window unit. In this connection, the control unit has an interface via which the control unit is connected to a network system of the aircraft for operation of the shading device. Likewise, the lighting device is coupled with the control unit, so that the lighting device can be operated with the network system of the aircraft via the interface of the control unit.

9 Claims, 1 Drawing Sheet

WINDOW UNIT FOR AN AIRCRAFT WITH SHADING AND LIGHTING FUNCTIONS

CROSS-REFERENCE TO RELATED APPLICATIONS

This application claims the benefit of the filing date of U.S. Provisional Patent Application No. 60/765,923 filed Feb. 7, 2006, the disclosure of which is hereby incorporated herein by reference.

BACKGROUND OF THE INVENTION

The present invention relates generally to the technical field of fitting assemblies as well as the area of cabin design of aircraft. In particular, the present invention relates to a window unit in an aircraft, with which individual light scenarios can be produced. In addition, the invention relates to an aircraft, which is equipped with at least one of the window units according to the present invention.

In particular, in the area of first class, but also in the area of business class, it is frequently common in aircraft in the meantime to form the window to be shaded, or rather, shaded, so that the passengers must no longer protect themselves manually from incidental light by pulling down mechanical window coverings. The shading of the panes takes place, in this regard, for example by a crystalline coasting of the panes, whereby the crystals have different polarization directions, which can be effected by imposition of an electrical voltage, such that by means of this type of coated pane, depending on the applied voltage, only a determined portion of light can penetrate through. In contrast to mechanical window coverings, this may be associated with the advantage that also only a partial shading of the window is possible, in order to absorb the incidence of light.

For actuating these types of shading devices or window blinds, these may include a control unit, which are equipped for controlling and monitoring the shading device or window blind, whereby the control unit has an interface, in order to enable control of the shading devices via a provided network system on the aircraft, which is typically used for controlling a plurality of cabin systems. This network system operates as a cabin management system, which is known in Airbus also under the abbreviation CIDS—Cabin Intercommunication Data System.

In the recent past, numerous efforts were undertaken to improve or more aesthetically configure cabin lighting, for example, by the production of individual light effects or specialized light scenarios or by producing specialized light tuning mechanisms. Under the aspect of light design, it is frequency desirable to arrange lighting elements in the area of the window, for example, in the area of the window funnel, under which one understands the area of the inner lining, which tapers from the inner chamber of the cabin in a funnel shape in the direction of the window pane.

The provision of the wiring and control units required for this lighting as well as the requirements according to a corresponding interface in order to be able to control the described light tuning mechanisms for the network system of the aircraft, may be associated with additional weight, which of course, is always undesired in the area of aircraft and space travel technology.

SUMMARY OF THE INVENTION

There may be a need to provide a realization, which permits operation of light tuning in the area of the window funnel, without greatly increasing the weight as a result of the control devices required to operate the light tuning mechanisms.

Within the scope of the present invention, with regard to tuning lighting, it is to be understand that lighting or illumination devices in the area of the window funnel are intended, which may be used specifically for producing different lighting effects or lighting scenarios.

According to a first aspect of the present invention, the said need may be met by with a window unit in an aircraft, which includes a window pane, which is coated with an electrically actuatable shading device or window blind for reducing incidental light entering through the window pane. This type of coating may be a crystalline coating, for example, which only permits a specific portion of light to penetrate, depending on a voltage applied to it. For example, this type of coating may be a so-called SPD film. In addition to the coated window pane, the window unit of the present invention further may includes a control unit, which is equipped in order to actuate the shading device of the window pane, in particular to activate and deactivate this. Lastly, the window unit may includes a lighting device for producing a light effect in the area of the window unit. The control unit for actuating the shading device has an interface, via which the control unit is connected to a network system of the aircraft. The lighting device may be further coupled to each control unit, so that this can be operated by means of the network system of the aircraft via the interface of the control unit.

Thus, for actuating of the lighting device, access may be made to the already provided control unit for actuating the shading device, which, if necessary, may broadened to a determined functionality for operating the lighting device, so that for the operation of the lighting device, no additional control unit, and therefore, no additional weight, may be required. In addition, the control unit of the shading device may be controlled via the data bus of the network system of the aircraft.

In addition, the lighting device may be supplied with energy also via the control unit of the shading device, so that in this regard, also no additional wiring for energy supply may be required, which likewise would be noticeable with substantial weight.

By reliance on the already provided control unit, therefore, the lighting device may be controlled by the network system of the aircraft via the control unit of the shading device, which supplies the lighting device with the required control signals.

According to a further aspect of the invention, the window unit further may includes a window funnel, at whose smaller opening the window pane is located and which faces with is widening in the direction of the passenger cabin of the aircraft, so that it forms a section of the inner lining of the passenger cabin. In this regard, the lighting device may be arranged on the window funnel such that the widening of the window funnel is illuminated with operation of the lighting device at least partially by the lighting device.

By the arrangement of the lighting device on the window funnel, completely individual lighting effects and scenarios may be produced, therefore, in combination with operation of the shading device, whereby the comfort of the passengers can be provided. The arrangement of the lighting devices on the window funnels may be of further advantage, in that the equipment assembly may be illuminated, since the window funnel together with the lighting devices mounted therefore may be supplied as pre-manufactured components.

The lighting device may include a multitude of illumination means, for example, which are arranged in the widening region of the window funnel on the side facing the passenger cabin. On aesthetic grounds, it may be provided, however, that the multitude of illumination means are arranged on the outer side of the window funnel in the region of the widening area on the side of the window funnel facing away from the passenger cabin, so that the illumination means are not directly visible for the passengers. In this case, the window funnel can have a plurality of openings in its widening area, through which the light produced by the illumination means may be beamed into the widening area.

In order to enable production of particularly attractive light effects or scenarios, the illumination means may be formed, for example, in order to produce light of different wavelengths, which is may be realized by using so-called RGB-LED's as illumination means. Of course, however, also incandescent bulbs also may be used as the illumination means.

Lastly, according to a further aspect of the invention, an aircraft may be provided, in which at least one window unit is installed, as described in the previous passages.

BRIEF DESCRIPTION OF THE DRAWINGS

Next, the invention will be described by way of example with reference to the accompanying drawing. At this point, it should be noted that the embodiment of the invention shown in the figure only explains it purely by way of example and in particular, may not be viewed as limiting the scope of protection.

DETAILED DESCRIPTION

Figure 1:
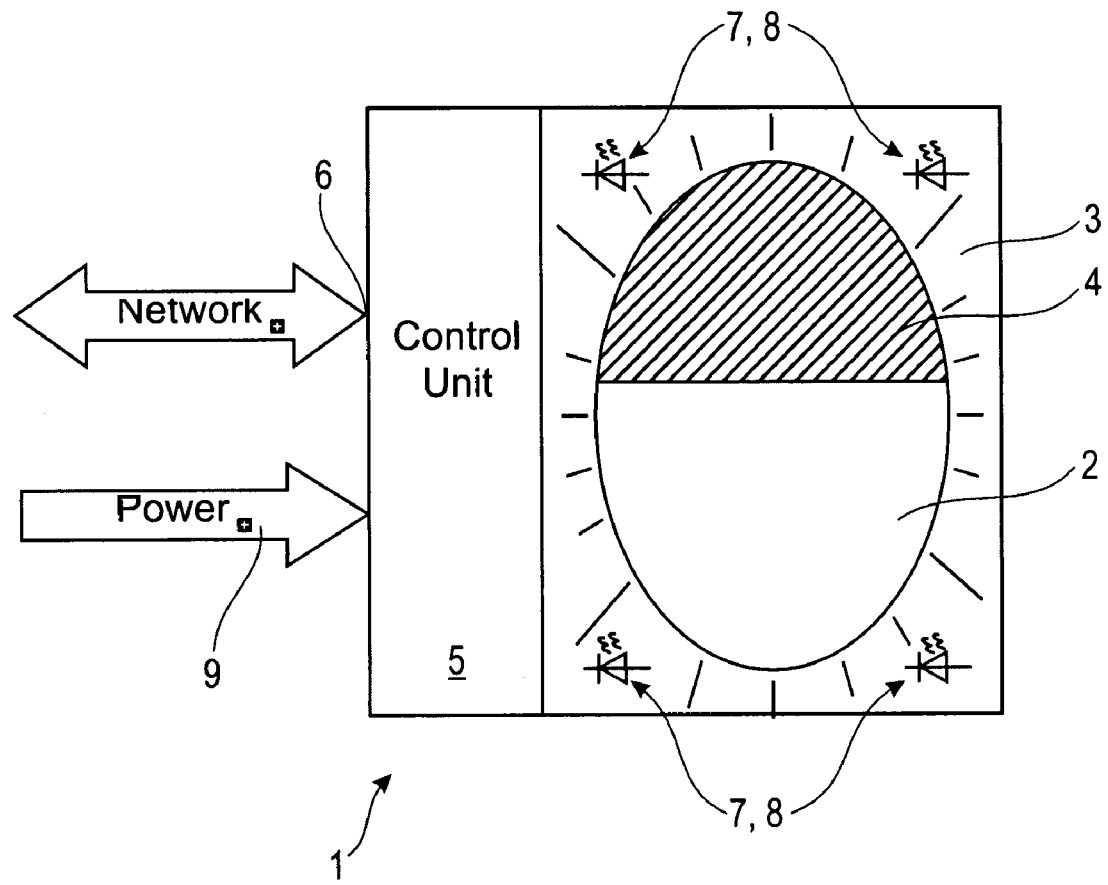
FIG. 1 shows a schematic representation of the window unit according to the present invention.

FIG. 1 illustrates a window unit 1 according to the present invention with reference to an exemplary embodiment. The window unit 1 comprises essentially a window funnel 3, which here has an oval window opening. This oval window opening represents the smaller opening of the window funnel 3, at which in the standard manner, a window pane 2 is located, in order to restrict the cabin interior of an aircraft from the outer atmosphere. The window pane 2 is coated with an electrically actuatable shading device 4, with which the light entering the window pane 2 can be reduced. In this connection, the window pane 2 can be coated either completely or only partially with the shading device 4, for example, in the form of an SPD film, as is the case in the present exemplary embodiment in the upper region of the window pane 2.

The window unit 1 according to the present invention further includes a control unit 5, with which the shading device 4 can be operated, in which different voltages can be applied via the control unit 5, whereby the light permeability of the shading device 4 can be changed. The control unit 5 can be arranged behind the window funnel 3 forming the inner lining as viewed from the cabin chamber.

In order to enable actuation of the shading device via the cabin network system of the aircraft, the control unit 5 has an interface 6, via which the control unit 5 is connected to the network system of the aircraft for operation of the shading device 4. In addition, the control unit 5 is supplied with current via an energy supply 9, so that the control unit can apply different voltages to the shading device 4 depending on the need, in order to shade this differently by polarizing effects.

As can be seen further in FIG. 1, the window unit 1 according to the present invention further includes a lighting device 7 in the form of four illumination means 8, which are formed in the shown exemplary embodiment as RGF light diodes. The light diodes are arranged on the backside or outer side of the window funnel 3 in the region of the widening area.

In order to not to have to provide additional control units for the lighting device 7, which would bring along additional weight in an undesired manner, the lighting device 7 likewise is coupled with the control unit 5 of the shading device 4, so that the lighting device 7 or the individual illumination means 8 can be operated by the network of the aircraft via the interface 6 of the control unit 5. In this manner, the individual illumination means 8 can be controlled separately for production of individual light effects or scenarios without an additional control unit. Thus, individual and exciting light effects can be produced by interplay of the shading device 4 and the lighting device 7, without requiring additional control units for operating the shading device 4.

In addition, it should be noted that terms like "including" or "comprising" does not exclude any other elements or steps and "a", "an" or "one" does not exclude a plurality. In addition, it should be noted that features or steps, which have been described with reference to one of the above exemplary embodiments also can be used in combination with other features or steps of other above-described exemplary embodiments. Reference signs in the claims are not to be viewed as limitations.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

REFERENCE LIST 1 window unit
2 window pane
3 window funnel
4 shading device
5 control unit
6 interface
7 lighting device
8 illumination means
9 energy supply

The invention claimed is:

1. A window unit in an aircraft, comprising:
  a window pane is coated with an electrically actuatable shading device for reducing incidental light penetrating through the window pane;
  a control unit for operating the shading device;
  a lighting device for producing a light effect in the region of the window unit;
  whereby the control unit has an interface, via which the control unit is connected to a network system of the aircraft for operation of the shading device;
  wherein the lighting device likewise is coupled with the control unit, in order to operate the lighting device with the network system of the aircraft via the interface of the control unit.

2. A window unit according to claim 1, wherein the lighting device is supplied with energy via the control unit of the shading device.

3. A window unit according to claim 1, wherein the lighting device is controlled by the network system of the aircraft via the control unit of the shading device, which supplied the lighting device with the necessary control signals.

4. A window unit according to claim 1, further comprising:
a window funnel, at whose smaller opening the window pane is located and which faces in the direction of the passenger cabin of the aircraft with its widening, so that it forms a section of the inner lining of the passenger cabin,
whereby the lighting device is arranged on the window funnel, such that the widening of the window funnel is illuminated at least partially by the lighting device upon operation of the lighting device.

5. A window unit according to claim 4,
wherein the lighting device includes a plurality of illumination means, which are arranged in the widening area of the window funnel.

6. A window unit according to claim 4,
wherein the lighting device includes a plurality of illumination means, which are arranged on the outer side of the window funnel in the region of the widening area.

7. A window unit according to claim 5,
wherein the illumination means are formed in order to produce light of different wavelengths.

8. A window unit according to claim 5,
wherein the illumination means are formed as RGB light diodes.

9. An aircraft comprising at least one window unit, the window unit comprising:
a window pane is coated with an electrically actuatable shading device for reducing incidental light penetrating through the window pane;
a control unit for operating the shading device;
a lighting device for producing a light effect in the region of the window unit;
whereby the control unit has an interface, via which the control unit is connected to a network system of the aircraft for operation of the shading device;
wherein the lighting device likewise is coupled with the control unit, in order to operate the lighting device with the network system of the aircraft via the interface of the control unit.

* * * * *